(12) United States Patent
Anyan et al.

(10) Patent No.: US 9,381,868 B2
(45) Date of Patent: Jul. 5, 2016

(54) HITCH ADAPTER

(71) Applicant: RakAttach LLC, Park City, UT (US)

(72) Inventors: Walter Anyan, Park City, UT (US); Paul W. McMullin, Sandy, UT (US)

(73) Assignee: RAKATTACH LLC, Park City, UT (US)

( * ) Notice: Subject to any disclaimer, the term of this patent is extended or adjusted under 35 U.S.C. 154(b) by 0 days.

(21) Appl. No.: 14/620,067

(22) Filed: Feb. 11, 2015

(65) Prior Publication Data
US 2015/0224837 A1    Aug. 13, 2015

Related U.S. Application Data

(60) Provisional application No. 61/939,142, filed on Feb. 12, 2014.

(51) Int. Cl.
*B60R 9/10* (2006.01)
*B60R 9/06* (2006.01)

(52) U.S. Cl.
CPC .... *B60R 9/10* (2013.01); *B60R 9/06* (2013.01)

(58) Field of Classification Search
CPC .............. B60D 1/54; B60D 1/52; B60R 9/10; B60R 9/06
USPC .......................... 224/504, 505, 506, 507, 509; 280/491.1, 491.3
See application file for complete search history.

(56) References Cited

U.S. PATENT DOCUMENTS

| 5,518,159 A | * | 5/1996 | DeGuevara | B60R 9/10 224/282 |
| 5,664,717 A | * | 9/1997 | Joder | B60R 9/10 224/502 |
| 6,123,498 A | * | 9/2000 | Surkin | B60R 9/06 224/509 |
| 6,199,735 B1 | * | 3/2001 | Cothern | B60R 9/06 224/509 |
| 6,237,823 B1 | * | 5/2001 | Stewart | B60R 9/065 224/282 |
| 6,332,626 B1 | | 12/2001 | Morrill | |
| 6,364,337 B1 | | 4/2002 | Rowland et al. | |
| 6,386,410 B1 | | 5/2002 | Van Dusen et al. | |
| 6,460,870 B2 | | 10/2002 | Moss | |
| 6,722,380 B1 | | 4/2004 | Hafter | |
| 6,745,926 B2 | * | 6/2004 | Chimenti | B60R 9/06 224/495 |
| 6,957,826 B1 | | 10/2005 | MacKarvich | |
| 7,425,014 B1 | | 9/2008 | Palmer | |
| 7,819,128 B2 | | 10/2010 | Clark et al. | |
| 7,909,350 B1 | | 3/2011 | Landry | |
| 8,408,577 B2 | | 4/2013 | Works | |
| 8,474,852 B1 | | 7/2013 | Granados | |
| 8,485,207 B1 | | 7/2013 | Boyington | |
| 8,820,598 B2 | * | 9/2014 | Tennyson | B60R 9/065 224/509 |
| 2003/0184048 A1 | | 10/2003 | Bonde | |
| 2010/0213687 A1 | | 8/2010 | McDaniel et al. | |
| 2010/0270774 A1 | | 10/2010 | Boberg et al. | |

* cited by examiner

*Primary Examiner* — Kevin Hurley
(74) *Attorney, Agent, or Firm* — Holland & Hart LLP

(57) ABSTRACT

A hinged hitch adapter apparatus provides pivotal movement to an attached mount. The hinged hitch adapter apparatus may be configured with a receiver mount attachable to a hitch receiver, two elongate members connected at a pivotable joint, and a hitch adapter attached to one of the elongate members that may receive an attached mount. The hinged hitch adapter apparatus may allow mounts and racks connected to a standard hitch receiver tube to be pivoted away from a vehicle to which they are mounted and thereby grant easier and more convenient access to the rear of the vehicle while still providing wide compatibility with existing hitch-mounted devices, such as bicycle racks. The hitch adapter may also permit use of regular towing hitches.

19 Claims, 11 Drawing Sheets

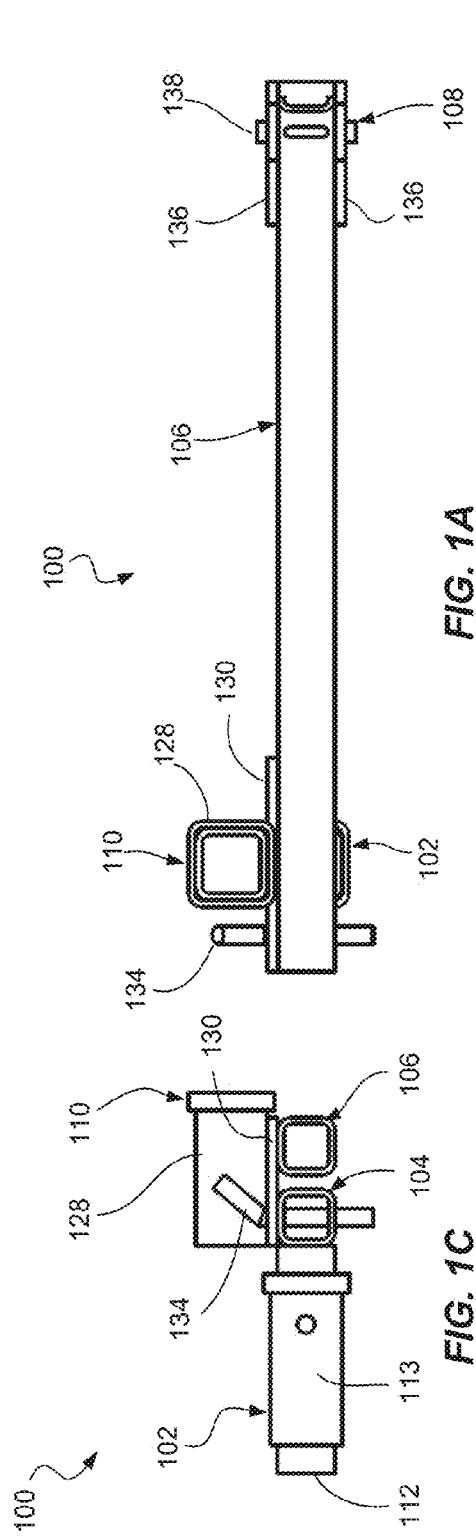
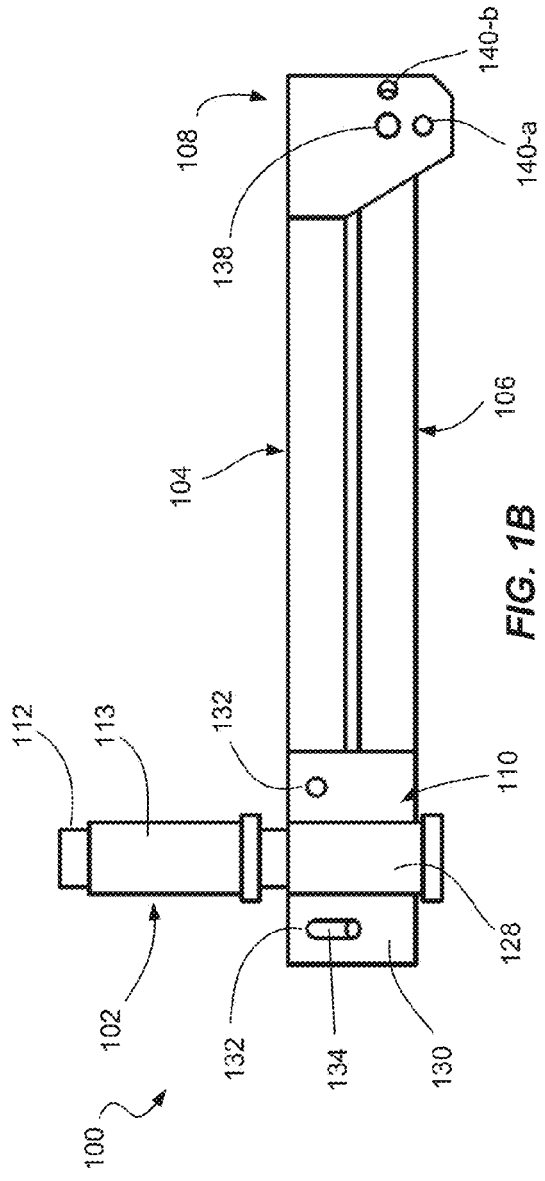

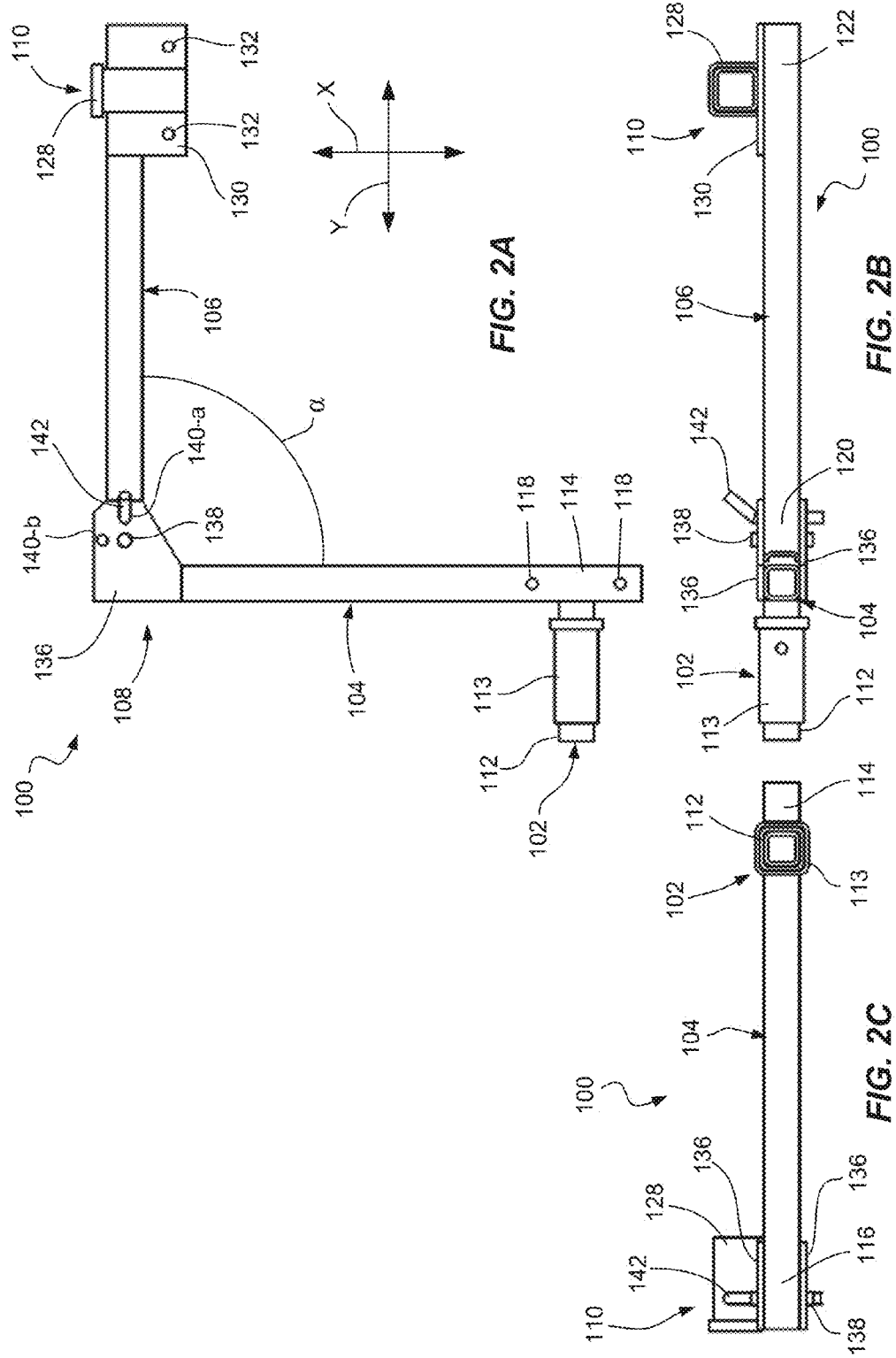

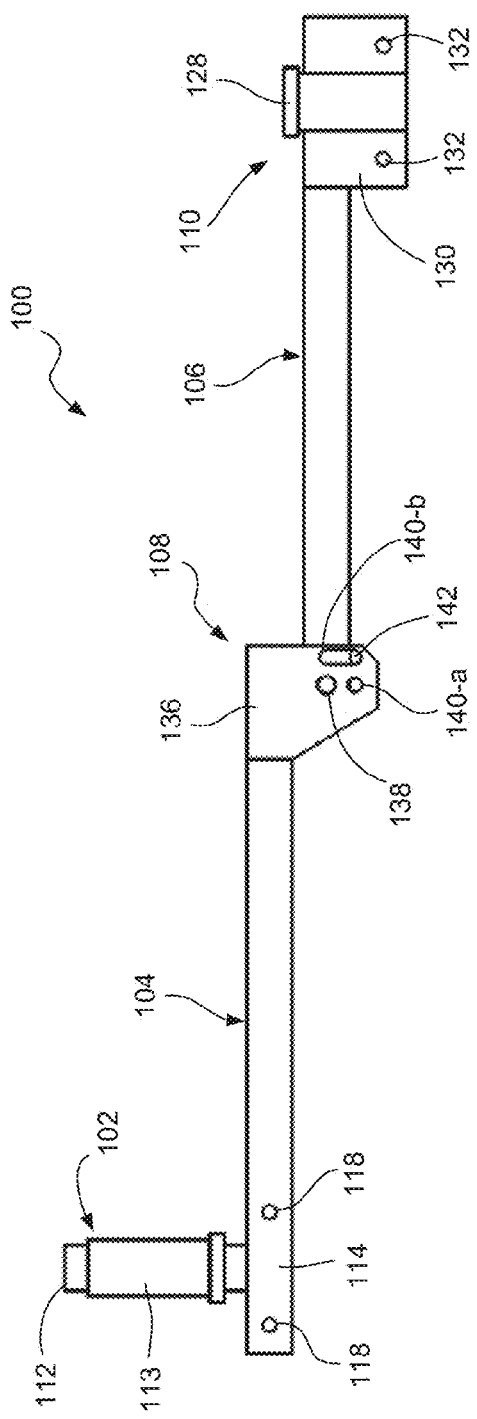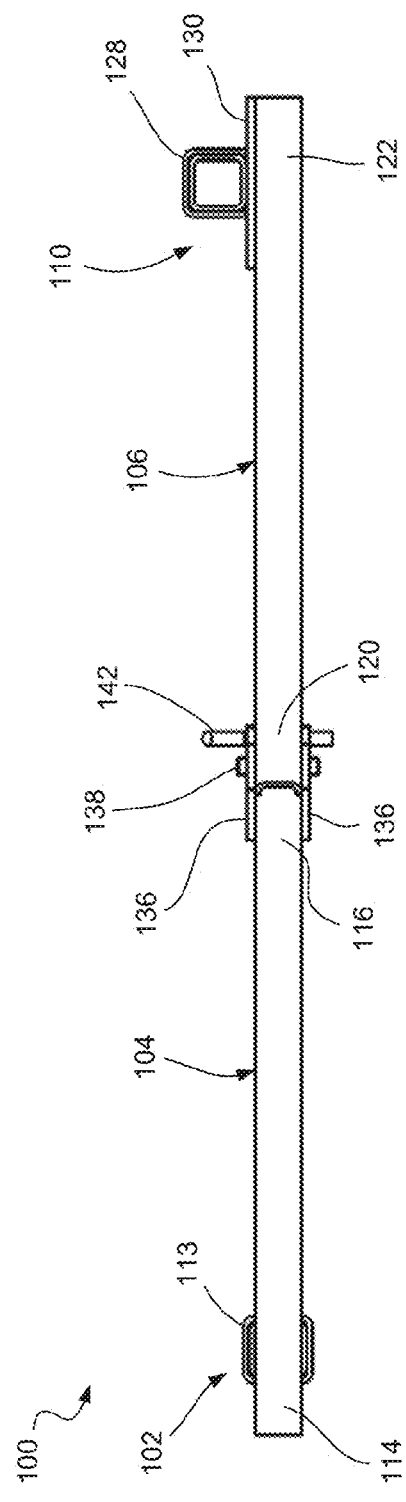

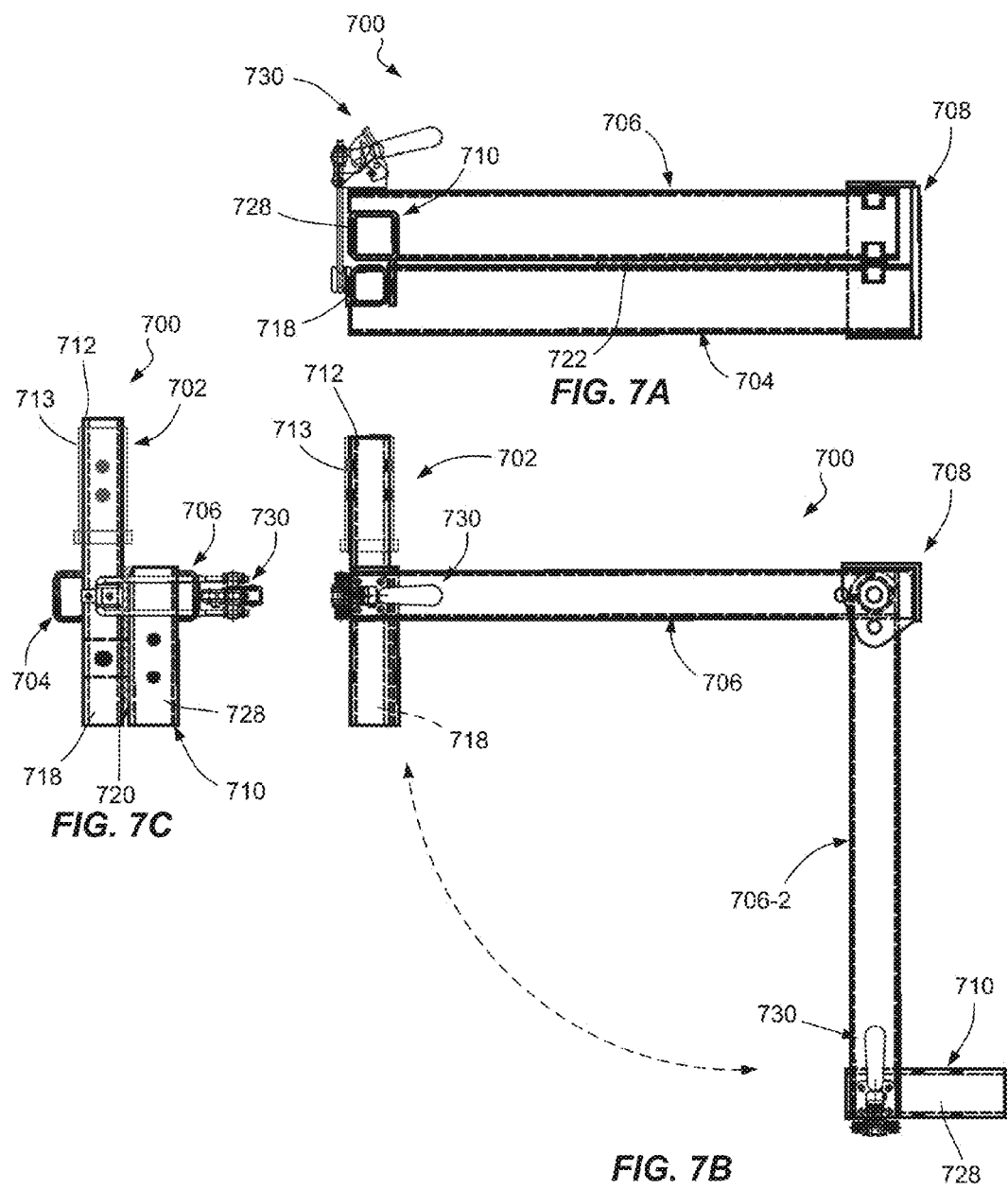

HITCH ADAPTER

CROSS-REFERENCE TO RELATED APPLICATION

This application claims the benefit of the filing date of U.S. Provisional Application No. 61/939,142, filed Feb. 12, 2014, and entitled HITCH ADAPTER, the disclosure of which is incorporated, in its entirety, by reference.

BACKGROUND

Motor vehicle equipment racks are mounted on a vehicle's exterior to transport bicycles, skis, surfboards, kayaks, and other cargo. The racks may be mounted to the top or sides of a vehicle, but some popular devices are rear-mountable using a vehicle trailer hitch receiver. A typical bicycle mount rack includes a portion attachable to the vehicle's hitch receiver, and a mast structure extends upward from the hitch-attached portion to an attachment rack that is secured to the bicycle's frame. Other hitch-mounted racks provide a platform that supports bicycle wheels or a wing-shape from underneath its wheels.

These racks are commonly frustrating to use. They are large and heavy, making them difficult to install, and in some cases, they completely prevent access to the trunk or rear door of the motor vehicle while they are attached. Some have a hinge that allows the mast to be vertically pivoted downward away from the rear of the vehicle, but this can be undesirable since bicycles and other equipment usually must be removed from the attachment rack before folding down. Then, even after folding, the mast and racks attached to it are a nuisance in accessing the rear door or trunk since they extend horizontally away from the center of the rear of the vehicle and must be stepped over or otherwise navigated around. Removing the rack to access the rear of the vehicle is not a preferable option, since the size and weight of the racks makes them difficult to handle, transport, and store once separated from the vehicle. Some products attempt to address these issues by extending the rack rearward from the trailer hitch, thereby making the rear of the vehicle easier to access between the rack and the vehicle and spacing the cargo on the rack from the vehicle. These provide only modest improvement, since the user is still required to squeeze between the rack and the vehicle, and they are still not compatible with vehicles having vertically- or horizontally-opening rear door.

Racks that are not mounted to a trailer hitch partially address these problems by strapping the rack to the car or using another attachment means, but these can be even more difficult to remove than hitch mounts, may damage the finish of the vehicle, usually don't hold enough weight, and are not compatible with every kind of vehicle. Thus, improved convenience and effectiveness of existing rack apparatuses are desired.

SUMMARY

According to at least one embodiment, a hinged hitch adapter apparatus shown and described herein may provide pivotal movement for an attached mount, such as an equipment rack. The hitch adapter apparatus may comprise a receiver mount configured to be attachable to a hitch receiver and a first elongate member. The first elongate member may have a first end and a second end, wherein the first end may be attached to the receiver mount. The first elongate member may extend laterally from the receiver mount. A second elongate member having first and second ends may be pivotally attached to the second end of the first elongate member at the first end of the second elongate member. At the second end of the second elongate member, a hitch adapter may be attached. The hitch adapter may be configured to be removably attachable to the first end of the first elongate member when the second end of the second elongate member is positioned proximate the first end of the first elongate member.

In this apparatus, the pivotal position of the first and second elongate members may be reversibly securable. For example, the pivotal position may be reversibly securable at a predetermined relative angle between the first and second elongate members. In some cases, the pivotal position may be reversibly securable at a plurality of predetermined relative angles between the first and second elongate members.

A locking pin may be used to reversibly secure the pivotal position of the apparatus. The locking pin may reversibly secure the second end of the second elongate member adjacent to the first end of the first elongate member. The locking pin may also reversibly secure the pivotal position of the first and second elongate members adjacent to the pivotal attachment of the two elongate members.

The receiver mount may be configured to be insertable into a vehicle trailer hitch receiver. The hitch adapter may also be configured to receive a vehicle trailer hitch.

The hitch adapter may be removably attachable at the second end of the second elongate member at a plurality of attachment positions relative to the second elongate member. Thus, the hitch adapter may comprise an attachment end, wherein when the hitch adapter is in a first position of the plurality of attachment positions, the attachment end is set at greater distance from the second elongate member than when the hitch adapter is in a second position of the plurality of attachment positions.

The hinged hitch adapter apparatus may have a range of relative pivotal movement of the first and second elongate members that is limited. Furthermore, the range of relative pivotal movement may be limited by interference between the second end of the first elongate member and the first end of the second elongate member. The range of relative pivotal movement may also be limited by contact of the second elongate member with an abutment surface of the first elongate member or by contact of at least one of the first and second elongate members with a locking pin.

In these apparatuses, the hitch adapter may have an attachment end that extends at least six inches from the hitch receiver upon securing the receiver mount in the hitch receiver.

Another embodiment is directed to a method of operating a hitch adapter apparatus. The method includes providing a hitch adapter apparatus having a receiver mount, first and second elongate members each having first and second ends, and a hitch adapter. The first end of the first elongate member is attached to the receiver mount, the second end of the first elongate member is pivotally attached to the first end of the second elongate member, and the hitch adapter is attached to the second end of the second elongate member. The method further includes mounting the receiver mount to a hitch receiver of a vehicle, and releasably connecting the hitch adapter to the first end of the first elongate member when the second end of the second elongate member is positioned adjacent to the first end of the first elongate member.

In one example, the first elongate member is positioned vertically below the second elongate member. The method may include providing an angle position stop and disconnecting the hitch adapter from the first end of the first elongate member and rotating the first and second elongate members relative to each other to an angle defined by the position stop.

The method may include providing at least one pad member positioned between the first and second elongate members.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIGS. 1A-1C show various plan views of a hinged hitch adapter apparatus of the present disclosure in a first rotated position.

FIGS. 2A-2C show various plan views of the hinged hitch adapter apparatus of FIGS. 1A-1C in a second rotated position.

FIGS. 3A-3B show plan views of the hinged hitch adapter apparatus of FIGS. 1A-1C in a third rotated position.

FIG. 7A is a side view of a hinged hitch adapter apparatus in a closed position.

FIG. 7B is a top view of a hinged hitch adapter apparatus in a closed position and in an open position.

FIG. 7C is an end view of a hinged hitch adapter apparatus in a closed position.

Figure 4:
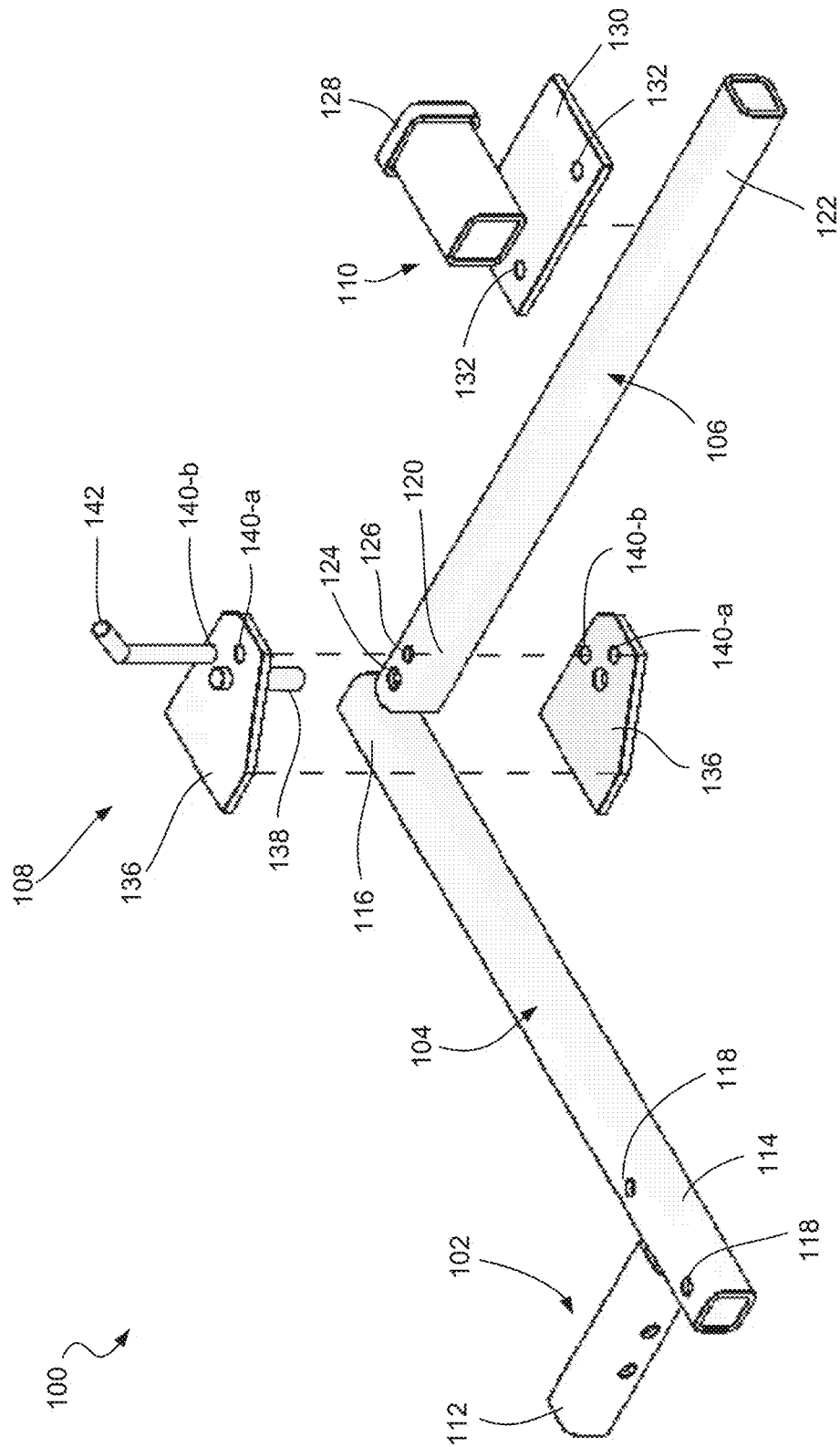
FIG. 4 is an exploded perspective view of the hinged hitch adapter apparatus of FIGS. 1A-3B.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

According to one aspect of the present disclosure, a bicycle rack mount adapter is provided that may allow bicycles and other equipment to be transported by motor vehicles in a convenient and effective manner. In one exemplary embodiment, a hinged hitch adapter apparatus is provided that is attachable to a vehicle's hitch receiver. The hinged hitch adapter may comprise at least two pivotally connected elongate members that allow a hitch-mountable rack to be pivoted away from a connected vehicle, thereby providing clear and easy access to the rear of the vehicle without removal of the rack mount from the vehicle's hitch receiver. In some arrangements, the hinged hitch adapter apparatus may be used to support a rack that is still loaded even after being pivoted away from the vehicle.

In some embodiments, the end of the elongate members may comprise a hitch adapter that replicates much of the functionality of the vehicle's hitch receiver, so users may attach a wide variety of equipment to the hinged hitch adapter apparatus that is configured to attach to a standard hitch receiver tube. The hinged hitch adapter apparatus may allow users to control the range of motion of the pivoting elongate members to accommodate a large number of existing vehicles, whether they have a trunk, left-hinged rear door, right-hinged rear door, vertically-opening rear door, tailgate, hatchback, or other door configuration. Many existing hitch mounts are not compatible with vehicles having tailgates or other outward-opening doors, but a properly configured hinged hitch adapter apparatus may stay connected to such vehicles even when a tailgate is down. In some cases, the pivoting direction of the elongate members may be configured to open in a plurality of selectable directions, so the hinged hitch adapter apparatus may be equally compatible with vehicles having doors that open to the left or to the right. Additionally, the control of the pivoting elongate members may be used to prevent the hitch adapter, or equipment attached thereto, from swinging into contact with and damaging the vehicle or adjacent objects (e.g., other nearby vehicles).

Another aspect of the present disclosure may include a method of providing a rack attached to a vehicle using a hitch adapter apparatus. The method may include attaching the hitch adapter apparatus to a hitch receiver of the vehicle, removably securing a second elongate member of the hitch adapter apparatus to a first elongate member of the hitch adapter apparatus, and attaching a rack mount to a receiver socket of the hitch adapter apparatus. The method may also comprise detaching the first elongate member from the second elongate member, pivoting the second elongate member away from the first elongate member, and locking the position of the first and second elongate members relative to each other. The relative position may be locked by a locking pin, by abutment of the elongate members against each other, abutment against a stop surface, or by similar means.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Turning now to the figures in detail, FIGS. 1A-3B are profile views of a hinged hitch adapter apparatus 100 according to an exemplary embodiment of the present disclosure. FIG. 4 shows an exploded perspective view of the embodiment of FIGS. 1A-3B. The hinged hitch adapter apparatus 100 is shown in rear view in FIGS. 1A and 3A, front view in FIG. 2C, top view in FIGS. 1B, 2A, and 3B, and right side view in FIGS. 1C and 2B. The hitch adapter apparatus 100 may comprise a receiver mount 102, a first elongate member 104, a second elongate member 106 connected to the first elongate member 104 at a joint 108, and a hitch adapter 110.

The receiver mount 102 may comprise a connector 112 configured for reception by a trailer hitch receiver tube 113 or hitch receiver extension tube of a motor vehicle (see also FIGS. 5A-6B). In FIGS. 1A-3B, connector 112 is shown received by a receiver tube 113, but in FIG. 4, the connector 112 is shown separate from the receiver tube 113.

The receiver mount 102 may be configured as the sole or primary point of support for the hitch adapter apparatus 100 upon attachment of the adapter apparatus 100 to a hitch receiver. The receiver mount 102 may therefore comprise a rigid, durable material such as, for example, metals including aluminum, steel, and durable metal alloys. In some embodiments, the receiver mount 102 may comprise pins, locking bolts, and other fasteners used to keep the connector 112 removably secured within a receiver tube 113 mounted to the vehicle.

The receiver mount 102 is typically configured to extend perpendicularly from the first elongate member 104. The receiver mount 102 may be attached to the first elongate member 104 at a first end 114. This allows increased lateral movement of the second elongate member 106 and hitch adapter 110 away from the receiver tube 113 upon relative rotation of the first and second elongate members 104, 106. The pivotal movement of the elongate members 104, 106 is described in further detail below. The receiver mount 102 may be attached to the first elongate member 104 by welding, bolting, bonding, interlocking parts, or another attachment method known in the art. In some embodiments, the receiver mount 102 may be welded with a webbing plate that stabilizes the orientation of the receiver mount 102 relative to the first elongate member 104 and improves the strength of their attachment, particularly under a torque applied by a load received by the hitch adapter 110.

Figure 6A:
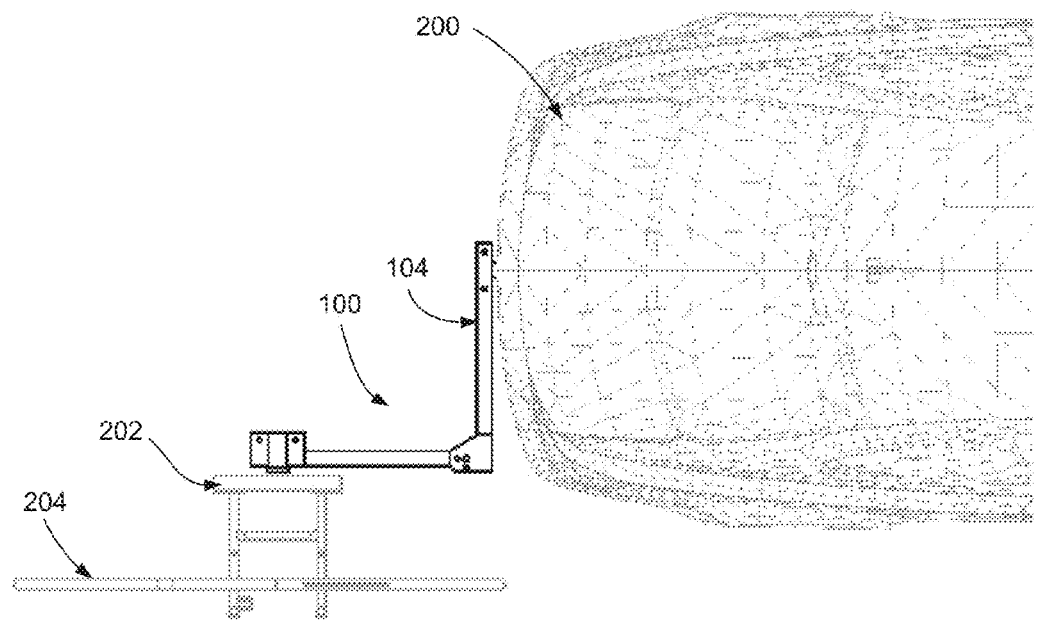
FIGS. 6A and 6B show top views of a hinged hitch adapter apparatus mounted to a vehicle in additional attachment configurations.
Figure 6B:
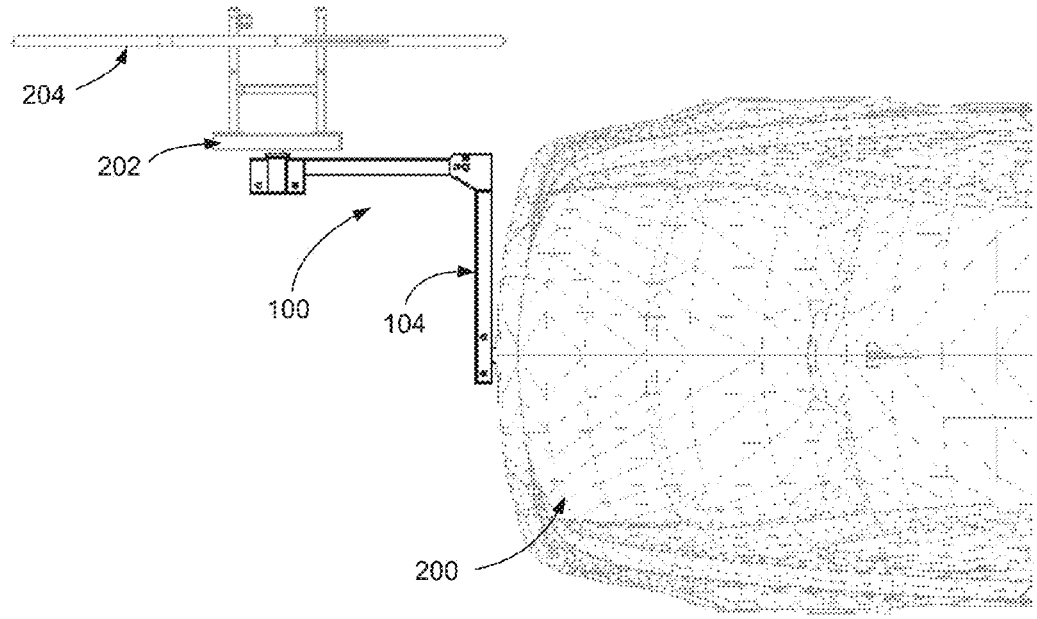

The first elongate member 104 may extend laterally from the receiver mount 102. In some embodiments, the first elongate member 104 extends laterally in a first direction (e.g., to the right of the receiver mount relative to the receiver tube of a vehicle), but the first elongate member 104 may also extend in a second direction (e.g., to the left), as shown in FIG. 6A-6B. The first elongate member 104 may comprise a rigid, durable material such as, for example, steel, aluminum, and durable metal alloys. The first and second elongate members 104, 106 may comprise a compatible material for being welded to or bonded to the receiver mount 102. The first and second elongate members 104, 106 may also comprise composite materials having sufficient rigidity and durability, such as carbon fiber composites. Preferably, the hitch adapter apparatus 100 weights 50 pounds or less when fully assembled and is capable of bearing (when in an open position—see FIG. 2A), for example, about 200 to 400 pounds, and more particularly up to about 400 to 600 pounds. The hitch adapter apparatus 100 may bear even more weight when in a closed position (see FIG. 1B), such as in the range of 2 to 10 times the weight bearing capacity possible when in the open position. This may beneficially correspond to capacity of carrying the weight of a rack having a plurality of bicycles (e.g., about three to five bicycles), a mechanical wheelchair, a cargo carrier, or the like.

The first elongate member 104 has a first end 114 and second end 116. The receiver mount 102 may be attached to the first end 114 and the second end 116 may be part of the joint 108. In the embodiments of the figures, the first and second elongate members 104, 106 are shown with a tubular square cross-sectional profile, but any other rigid cross-sectional shape may be used that can bear the weight of the hitch adapter apparatus 100 and loaded mounts borne by the hitch adapter. For example, the profile may include a circular tube, I-beam, rectangular beam, solid polygonal or circular bar, and any other similar suitable shape. A square tube may be beneficial because it may provide a high strength to weight ratio relative to some other configurations, such as a solid bar, and may facilitate easier manufacture and assembly of the parts of the adapter apparatus 100. Additionally, a hollow interior to the first and second elongate members 104, 106 may provide easier access to bolts, pins, or other elements that are extended through the elongate members 104, 106.

In some embodiments, the first elongate member 104 may comprise bolt apertures 118 which may be used to retain the hitch adapter 110, as described in further detail below. Typically, the bolt apertures 118 are positioned near the first end 114 of the first elongate member 104 in a manner correlating with bolt apertures 132 of the attachment plate 130 of the hitch adapter 110. In some arrangements, the bolt apertures 118 may be positioned nearer to the second end 116 of the first elongate member 104.

In some embodiments, the length of the first elongate member 104 may correspond to the distance between a centrally-located hitch receiver on a motor vehicle (typically at the center of the vehicle) and a side surface of the vehicle, such as the side of a rear fender. In this manner, the first elongate member 104 may position the joint 108 at its second end 116 out of the way of the rear door and other portions of the rear of the vehicle. Thus, in this configuration when the second elongate member 106 pivots away from the first elongate member 104, the rear of the vehicle is substantially clear of parts extending rearward where the rear door, hatch, or trunk of the vehicle is located. (See, e.g., FIG. 5A.) The lengths of the first and second elongate members 104, 106 may beneficially be between about 24 inches and about 50 inches, and more particularly between about 24 inches and about 32 inches. Many vehicles are about 70 to 82 inches across, so the length of these elongate members 104, 106 may be about half the width of the vehicle or within about a foot shorter than half the width of the vehicle to which the adapter apparatus 100 is attached to allow the hitch adapter 110 to pivot clear of the rear of the vehicle when rotated away from the receiver mount 102.

The second elongate member 106 may be pivotally attached to the first elongate member 104. In the figures shown, the second elongate member 106 has a first end 120 and a second end 122. The first end 120 of the second elongate member 106 may be pivotally attached to the second end 116 of the first elongate member 104 at the joint 108. The second end 122 of the second elongate member 106 may be configured to receive or be attached to the hitch adapter 110. The second elongate member 106 may have about the same length as the first elongate member 104. First and second elongate members 104, 106 having similar lengths may allow the hitch receiver tube 128 of the hitch adapter 110 to be aligned with the horizontal position of the receiver mount 102 and a receiver tube 113 of the vehicle, as shown in FIG. 1B. In some embodiments, the first end 120 of the second elongate member 106 may comprise a joint aperture 124 and a lock aperture 126 which are described in further detail in connection with joint 108.

The joint 108 may allow relative pivotal movement between the first and second elongate members 104, 106 of the hinged hitch adapter apparatus 100. For the example embodiment shown, FIGS. 1A-1C show the hinged hitch adapter apparatus 100 having the first and second elongate members 104, 106 in what may be referred to as a retracted, adjacent, closed, attached, transportable, or closed parallel position. FIGS. 2A-2C show the adapter apparatus 100 in what may be referred to as a perpendicular, first open, partially opened, partially extended, access, first locked, or partially rotated position. FIGS. 3A-3B show the adapter apparatus 100 in what may be referred to as a fully rotated, second open, fully extended, 180-degree, straight, second locked, or open parallel position. These relative positions may be readily compared in the top views of FIGS. 1B, 2A, and 3B. The angle α indicates the angle by which the relative angular positions of the first and second elongate members 104, 106 may be defined (see FIG. 2A).

Hitch adapter 110 may be attached to the second end 122 of the second elongate member 106. The hitch adapter 110 may comprise a hitch receiver tube 128 and an attachment plate 130. The hitch receiver tube 128 may be configured to receive a standard hitch or hitch-mounted device (e.g., a mast-based bicycle carrier rack). For example, the hitch receiver tube 128 may be a 2-inch (51 mm) square tube typically used for tow bars and other hitch-mounted equipment. The hitch receiver tube may also be sized or configured to receive hitches ranging from SAE Class I (1.25-inch/32 mm) to Class V (2.5-inch/ 64 mm) or may have another appropriate size according to the requirements of the equipment attached to the hinged hitch adapter apparatus 100. The connector 112 may beneficially match the size dimensions and may attach to hitch receiver tubes (e.g., receiver tube 113) having the same dimensions as the hitch receiver tube 128. If this is the case, the hinged hitch adapter apparatus 100 may act as an extension for the receiver tube of the vehicle and fit any attachments that would normally be compatible with the vehicle's receiver tube.

The attachment plate 130 may be attached (e.g., welded or bolted) to the hitch receiver tube 128. The attachment plate 130 may also be attached to the second end 122 of the second elongate member 106. In some embodiments, the attachment plate 130 may be removably attached to the hitch receiver tube 128 and/or second elongate member 106. The hitch adapter 110 may be positioned on either the top or the bottom of the second end 122 of the second elongate member 106. Thus, the attachment position of the hitch adapter 110 may therefore provide a rise or drop to the connector 112. The hitch adapter 110 may also be perpendicularly attached to the side of the second end 122. In such embodiments, the hitch adapter 110 may be attached in-plane with (i.e., horizontally and vertically aligned with) the receiver mount 102 when the hinged hitch adapter apparatus 100 is closed. FIGS. 1A-1C show an exemplary position of the hitch adapter 110 relative to the receiver mount 102.

The attachment plate 130 may comprise one or more bolt apertures 132. The bolt apertures 132 of the attachment plate 130 may align with the bolt apertures 118 of the first elongate member 104 when the hinged hitch adapter apparatus 100 is in a closed position. In that position, a locking pin 134 or bolt may be inserted through one or more bolt apertures 118, 132 to prevent relative rotation between the first and second elongate members 104, 106. When relative rotation between the elongate members is restricted, a rack mount or other device attached to the hitch adapter 110 may also be prevented from moving relative to the vehicle. The locking pins 134, 142 herein are shown as a rod with a bend that prevents the locking pins 134, 142 from falling through bolt apertures 118, 132, 140 upon insertion. In other embodiments, various other fastening mechanisms may be used, such as a bolt and nut, a spring-loaded locking pin, chain, padlock, clip, or a related fastening device. Thus, the bolt apertures 118, 132 may comprise threading or take another shape where appropriate.

In some configurations, the hitch receiver tube 128 may be adjustably connected to the attachment plate 130. The hitch receiver tube 128 may alternatively be fixedly connected to the attachment plate 130 with the entire hitch adapter 110 being adjustably connected to the second elongate member 106. For example, hitch adapter 110 may be attachable to the second elongate member 106 at a plurality of positions along the length of the second elongate member 106 (e.g., along axis Y in FIG. 2A). Thus, bolt apertures 118 may be positioned at multiple points along the first elongate member 104 to align with the hitch adapter 110 at various positions. Adjustment along the Y axis may be beneficial in transporting bicycles, since the point of attachment of a rack to the bicycle may not be centered relative to the front and rear wheels of the bicycle. Adjustment of the hitch adapter 110 along the Y axis may allow the user to center the bicycle and avoid wheels from extending beyond the side surfaces of the vehicle and thus potentially colliding with obstacles around the vehicle while it is in motion. Adjustment along the Y axis may also help prevent attached loads (e.g., a bicycle) from engaging the vehicle when the second elongate member 106 rotates relative to the first elongate member 104.

The hitch adapter 110 may also be adjustably connected to the second elongate member 106 at multiple positions along axis X in FIG. 2A, provided that the bolt apertures 132 may still align with bolt apertures 118 of the first elongate member 104. Similarly, the hitch receiver tube 128 may be adjustably connected to the attachment plate 130 at multiple positions along axis X in FIG. 2A. This may be beneficial in that the bolt apertures 132 of the attachment plate 130 and the bolt apertures 118 of the first elongate member 104 may not need to be repositioned. Repositioning the hitch receiver tube 128 may allow an end of the tube to extend or retract relative to the vehicle when the hinged hitch adapter apparatus 100 is closed. Thus, the hitch receiver tube 128 may provide an adjustable amount of clearance between the vehicle and the rack mounted in the hitch receiver tube 128.

With particular reference to FIG. 4, the joint 108 may comprise the second end 116 of the first elongate member 104, the first end 120 of the second elongate member 106, joint plates 136, pivot bar 138, and a locking pin 142. The joint plates 136 may be positioned adjacent to the end surfaces of the first and second elongate members. In the embodiments shown, the joint plates 136 are affixed to the top and bottom surfaces of the first elongate member 104, but are not attached to the second elongate member 106. The joint plates 136 may be integral with or permanently affixed to the first elongate member 104. The pivot bar 138 extends between the joint plates 136 and through the joint aperture 124 in the second elongate member 106. Therefore, the second elongate member 106 may rotate around the pivot bar 138 when it is not locked in place relative to the first elongate member 104 by a locking pin 134 or 142.

The joint plates 136 may comprise a plurality of bolt apertures 140. In some embodiments, both joint plates 136 have aligned bolt apertures 140, but in other cases a bolt aperture 140 may only allow a bolt or other securing device (e.g., locking pin 142) to only pass through one of the joint plates 136. The bolt apertures 140 may be positioned on the joint plates 136 in a position that allows a locking pin 142 to be inserted through one or more bolt apertures 140 and one or more lock apertures 126 of the second elongate member 106. Thus, the second elongate member 106 may be rotated around the pivot bar 138 from the position of FIGS. 1A-1C to the rotated perpendicular position of FIGS. 2A-2C or to the fully extended position of FIGS. 3A-3B. Then it may be locked into position by a locking pin 142, thereby preventing any additional relative rotation. As shown in FIG. 2A, a locking pin 142 may lock the second elongate member 106 at an about perpendicular position in a first bolt aperture 140-*a*, and, as shown in FIG. 3B, the locking pin 142 may lock the second elongate member 106 in a second bolt aperture 140-*b* (see also FIG. 1B, showing bolt apertures 140-*a*, 140-*b*). In some arrangements, the locking pin 142 may be the same pin as locking pin 134, just repositioned between bolt apertures 132 and 140. In some embodiments, multiple locking pins may be used to retain the second elongate member 106 in the position of FIG. 1B through the bolt apertures 132.

In some embodiments, the relative positions of the first and second elongate members 104, 106 may be restricted by a stop surface. For example, the second elongate member 106 may be configured to rotate around the pivot bar 138 into the extended position of FIGS. 3A-3B and then may be prevented from further rotation by contact between the first and second elongate members 104, 106. In this case, the stop surface may be an outer surface of the first or second elongate member 104, 106. In other embodiments, the joint 108 may comprise a surface that prevents rotation of the second elongate member 106 beyond a certain angular position. For example, the stop surface may be an additional plate comprised as part of joint 108 that prevents rotation of the second elongate member 106 beyond a certain rotated position relative to the first elongate member 104. In some arrangements, a locking pin 142 may be inserted through the joint plates 136 without extending through the first or second elongate members 104, 106. This configuration may prevent movement of the second elongate member 106 beyond a certain rotated position by contact between the locking pin 142 and one of the elongate members 104, 106. In one case, the locking pin 142 may thus prevent rotation of the second elongate member 106 away from the first elongate member 104 or may prevent rotation of the second elongate member 106 toward the first elongate member 104.

Controlling the limits of rotation of the second elongate member 106 may prevent an attached rack (and its cargo) and second elongate member 106 from making unintended or unwanted movements. For example, controlling the limits of rotation may prevent damage to the vehicle to which the hinged hitch adapter apparatus 100 is connected, adjacent vehicles, or other elements in the environment near the vehicle.

Figure 5A:
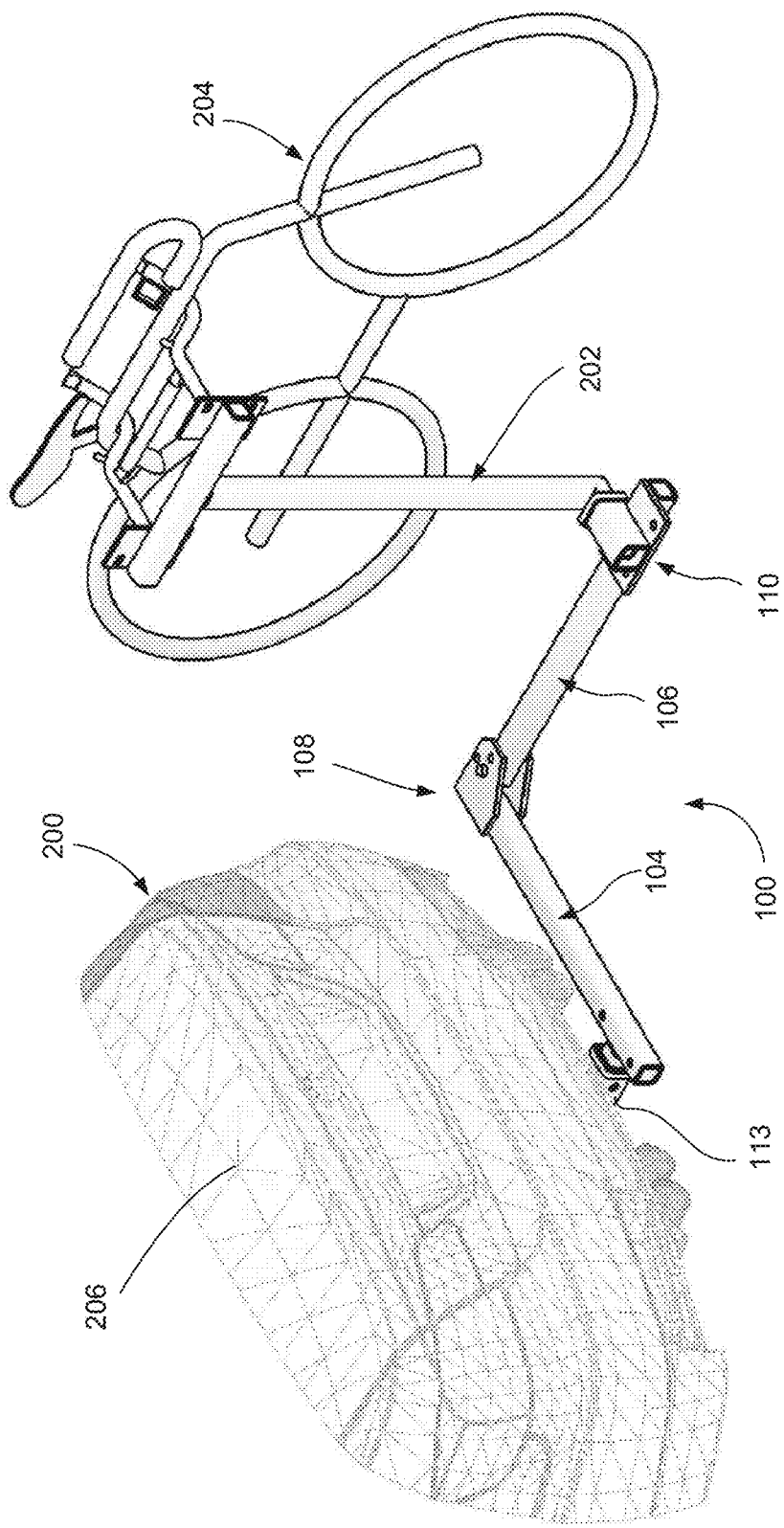
FIGS. 5A and 5B show perspective views of a hinged hitch adapter apparatus as mounted to a vehicle and to an attachment rack.
Figure 5B:
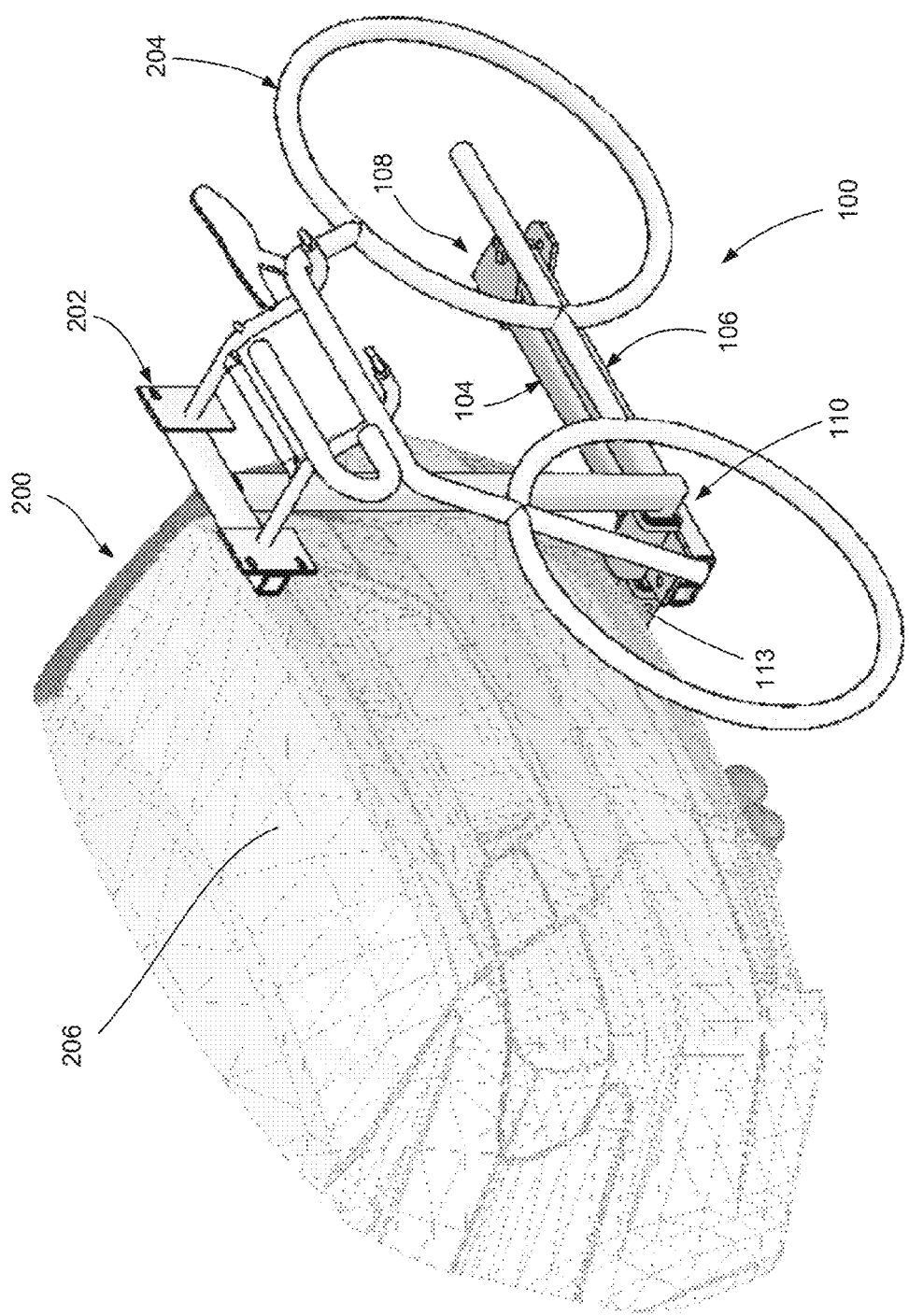

FIGS. 5A and 5B are illustrative examples of a hinged hitch adapter apparatus 100 linked to a vehicle 200 and an attachment rack 202. FIG. 5A shows that the vehicle's receiver tube 113 may be centrally located on the rear of the vehicle 200 and that the joint 108 of the hinged hitch adapter apparatus 100 may be positioned near the outer side of the vehicle, exposing the trunk 206 of the vehicle when the hinged hitch adapter apparatus 100 is in an open position with the second elongate member 106 rotated away from the first elongate member 104. Yet even with the joint 108 at this position, the hinged hitch adapter apparatus 100 may stay within the boundaries of the sides of the vehicle 200, thereby preventing the joint 108 from colliding with obstacles that are close to the side of the vehicle 200 toward which the joint 108 extends (see also FIG. 6A). Additionally, the length of the second elongate member 106 may be sufficient to keep cargo (e.g., a mounted bicycle 204) from engaging the vehicle 200 when it is mounted on the open hinged hitch adapter apparatus 100. The attachment rack 202 may also bear other kinds of loads attachable to a receiver tube 113, such as, for example, a wheelchair, kayak, cargo carrier, etc.

As shown in FIG. 5B, the hinged hitch adapter apparatus 100 may be secured in a closed position, wherein the attachment rack 202 is near the rear of the vehicle 200. In this position, the attachment rack 202 may support its cargo in a manner substantially similar to the case where an attachment rack 202 is attached directly to a receiver tube 113. For example, a bicycle 204 may be at about the same position relative to the vehicle that it would be in if no hitch adapter apparatus 100 was installed. This may be advantageous because specialized or customized attachment racks 202 are not required. Widely available equipment may be used with the hinged hitch adapter apparatus 100 with the added benefits afforded by the hinged hitch adapter apparatus 100.

The hinged hitch adapter apparatus 100 may in some embodiments provide a rise or drop to the attachment rack 202. In typical applications, the rise or drop will not have a significant impact on the usability of an attached attachment rack 202. The rise or drop may also be advantageous in some cases to control the clearance between the cargo on the attachment rack 202 and the ground (e.g., when the adapter apparatus 100 provides a rise) or may increase visibility through the back of the vehicle (e.g., when the apparatus provides a drop). The amount of rise or drop provided may be determined by the position where the hitch adapter 110 is attached to the second elongate member 106. If the surface of the second elongate member 106 having the hitch adapter is oriented upward, the adapter apparatus 100 may provide a rise, and if the surface is oriented downward, the apparatus may accordingly provide a drop. The orientation of the surface on the second elongate member 106 may be determined by the orientation of the hinged hitch adapter apparatus 100 relative to the receiver tube 113 on the vehicle 200 (e.g., whether the first elongate member 104 extends to the left or right; see FIGS. 6A-6B), or may be determined by whether a removably attachable hitch adapter 110 is attached to a surface facing upward or downward (e.g., in cases where the first elongate member 104 extends in a given direction).

In some embodiments, the hinged hitch adapter apparatus 100 may provide additional clearance between the attachment rack 202 and the vehicle 200, which may be beneficial in keeping the cargo on the attachment rack 202 from contacting the vehicle 200 and potentially blemishing or damaging the vehicle 200. In typical embodiments, the hinged hitch adapter apparatus 100 may provide about six inches of clearance from the hitch receiver tube 113 on the vehicle 200. This additional clearance may also improve access to the rear of the vehicle 200 (e.g., access to the trunk 206) even without the hinged hitch adapter apparatus 100 being in an open position, e.g., while it is in the closed configuration of FIG. 5B. The improved access may be provided by additional separation of the cargo and attachment rack 202 from the vehicle 200 due to space between the end of the hitch receiver tube 128 of the hinged hitch adapter apparatus 100 and the end of the receiver tube 113 on the vehicle. In some embodiments, the spacing of these elements may be increased or decreased by repositioning the hitch receiver tube 128 relative to the receiver tube 113. In some cases, the hitch receiver tube 128 may be adjustably connected to the attachment plate 130 or to the second elongate member 106 for this purpose.

FIGS. 6A and 6B are illustrative embodiments of a hinged hitch adapter apparatus 100 according to the present disclosure. These figures show an embodiment of the hinged hitch adapter apparatus 100 that is reversibly attachable to a vehicle 200. In FIG. 6A, the adapter apparatus 100 may be referred to as being mounted to the vehicle 200 and extending toward a first direction, which may also be referred to as a right-facing direction. The adapter apparatus 100 may in this configuration rotate the attachment rack 202 to the right side of the vehicle 200. In FIG. 6B, the adapter apparatus 100 may be referred to as being mounted to the vehicle 200 and extending toward a second direction, which may be referred to as a left-facing direction. In this configuration, the attachment rack may be rotated to the left side of the vehicle 200.

In some embodiments, the hinged hitch adapter apparatus 100 may be interchangeably attachable between the first and second directions based on whether the receiver mount 102 is mounted with a particular outer surface facing upward. In other arrangements, the receiver mount 102 may be mounted in one orientation, but the connection between the receiver mount 102 and the first elongate member 104 may allow rotation or translation of the first elongate member 104 from a right-facing direction to a left-facing direction or vice versa. In yet another embodiment, the receiver mount 102 may be removable from the first end 114 of the first elongate member 104 and attachable to the second end 122 of the second elongate member 106, and the hitch adapter 110 may be attachable to the first end 114 of the first elongate member 104. In this case, the second elongate member 106 may be positioned extending laterally from a receiver tube 113 and the first elongate member 104 may be pivotable relative to the second elongate member 106 in a manner that provides rotation of an attachment rack 202 to a left-facing direction. Changing the direction of the hitch adapter apparatus 100 from left-facing to right-facing, or vice versa, may provide improved clearance for a door at the rear of the vehicle 200, such as doors that are hinged on the left or right side of the vehicle 200 and swing open (as may commonly be found on small sport utility vehicles (SUVs)). The reversible direction may also improve access to the rear of the vehicle for drivers that would normally access the rear of the vehicle from the driver's side of the vehicle, since the driver's side of the vehicle may be positioned on the left or right of the vehicle depending on the model of vehicle.

FIGS. 7A-7C show a hinged hitch adapter apparatus 700 according to another embodiment of the present disclosure. The hinged hitch adapter apparatus 700 in these figures has many features in common with other hinged hitch adapter apparatuses described herein, such as, for example, a receiver mount 702, a first elongate member 704, a second elongate member 706 connected to the first elongate member 704 at a joint 708, and a hitch adapter 710. The receiver mount 702 also has a connector 712 configured for reception by a trailer hitch receiver tube 713 or hitch receiver extension tube of a motor vehicle.

In this hinged hitch adapter apparatus 700 the first and second elongate members 704, 706 are joined in such a manner that the second elongate member 706 is configured to pivot between a position vertically above the first elongate member 704 (as shown, for example in FIGS. 7A and 7C) to a position pivoted away from the first elongate member 704 (as shown, for example, by second elongate member 706-2 in FIG. 7B). In FIG. 7B, the second elongate member 706 is shown in the position above the first elongate member 704 as numeral 706 and in the outwardly rotated position as numeral 706-2.

A vertical relative orientation between the first and second elongate members 704, 706 may improve stability and rigidity of the hinged hitch adapter apparatus 700 while the apparatus is in a closed position. For example, with a load attached to a hitch receiver tube 728 on the second elongate member 706, the weight of the load may tend to push or bend the second elongate member 706 toward the ground. Therefore, by positioning the second elongate member 706 above the first elongate member 704, the first elongate member 704 may provide a lower underlying support, at least temporarily while the apparatus is in a closed position, for the second elongate member 706 to bear the weight of the load. Additionally, some reactive moments applied to the receiver tube 713 of the vehicle due to the load may be reduced due to the hitch receiver tube 728 being positioned horizontally closer to the receiver tube 713. When the second elongate member 706 is rotated away from the first elongate member 704, the first elongate member 704 may no longer provide direct undergirding support (except at or near the joint 708), but the connection of the elongate members 704, 706 at the joint 708 may still transfer loads from the second elongate member 706 to the first elongate member 704 similar to embodiments described elsewhere herein.

Figure 8A:
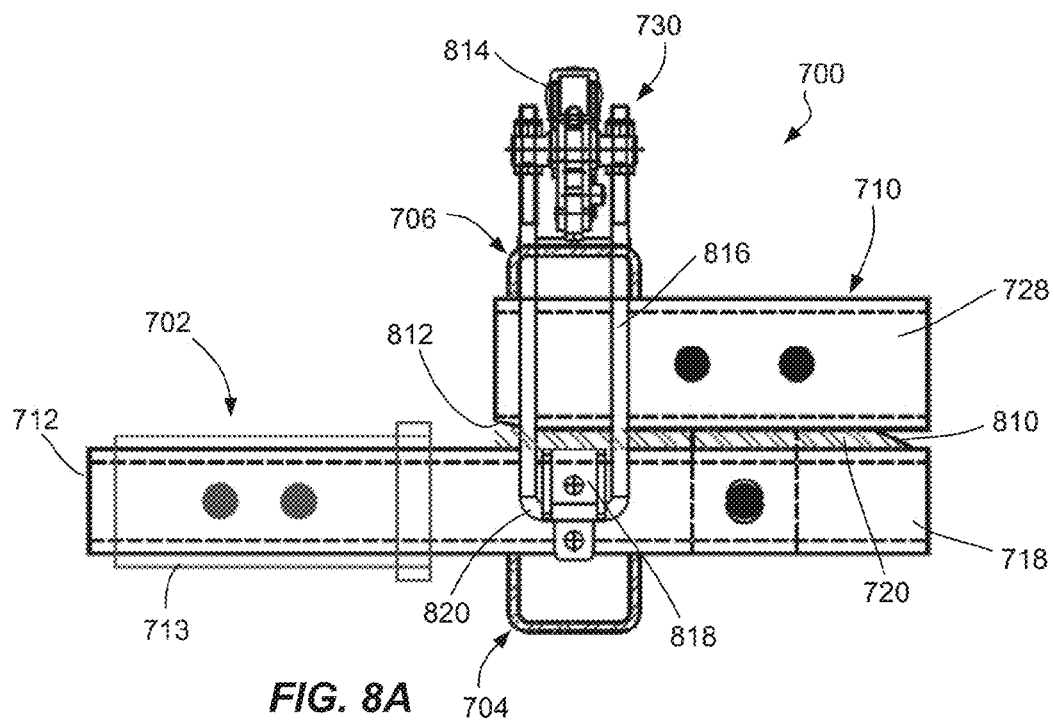
FIG. 8A is an end view of a hinged hitch adapter apparatus in a closed position.

In some embodiments, the first elongate member 704 may be connected to a support member 718. The support member 718 may extend away from the connector 712 (as shown in FIGS. 7C and 8A) or may extend from the first elongate member 704 at another position. The support member 718 may be placed on the hinged hitch receiver apparatus 700 in such a manner that the support member 718 is configured to be positioned below the hitch receiver tube 728 when the hinged hitch adapter apparatus 700 is in a closed position. The support member 718 may therefore further provide reinforcement at the underside of the hitch receiver tube 728. The support member 718 may in some cases have a tubular construction that is an extension of the shape and profile of the connector 712. The support member 718 may extend along the full length of the hitch receiver tube 728 and the width of the second elongate member 706, as shown in FIG. 7C. In some arrangements, the support member 718 may extend partially along the length of the hitch receiver tube 728 and/or second elongate member 706.

A plurality of pad members 720, 722 may be attached to the hinged hitch adapter apparatus 700 between the first and second elongate members 704, 706 and/or between the support member 718 and the hitch adapter 710. See also FIG. 9A. The pad members 720, 722 may comprise a durable, rigid material such as nylon to improve the durability of the hinged hitch adapter apparatus 700 where the elongate members 704, 706, support member 718, and hitch adapter 710 come into contact with each other. The pad members 720, 722 may also be used as spacers to keep these various elements of the hinged hitch adapter apparatus 700 properly aligned relative to each other when the apparatus is in a closed position.

The pad members 720, 722 may also comprise one or more sloped or rounded surface 810. See FIG. 8A. A sloped surface 810 may on the pad members 720, 722 may help guide the movement of the first and second elongate members 704, 706 and the hitch adapter 710 as the hinged hitch adapter apparatus 700 is put into the closed position from the open position. In some embodiments, the hitch adapter 710 and/or second elongate member 706 may also comprise a sloped or rounded surface 812 that may ease the movement of the hitch adapter 710 and/or second elongate member 706 onto the top of the pad members 720, 722 when it comes into contact with the sloped surface 810.

Figure 8B:
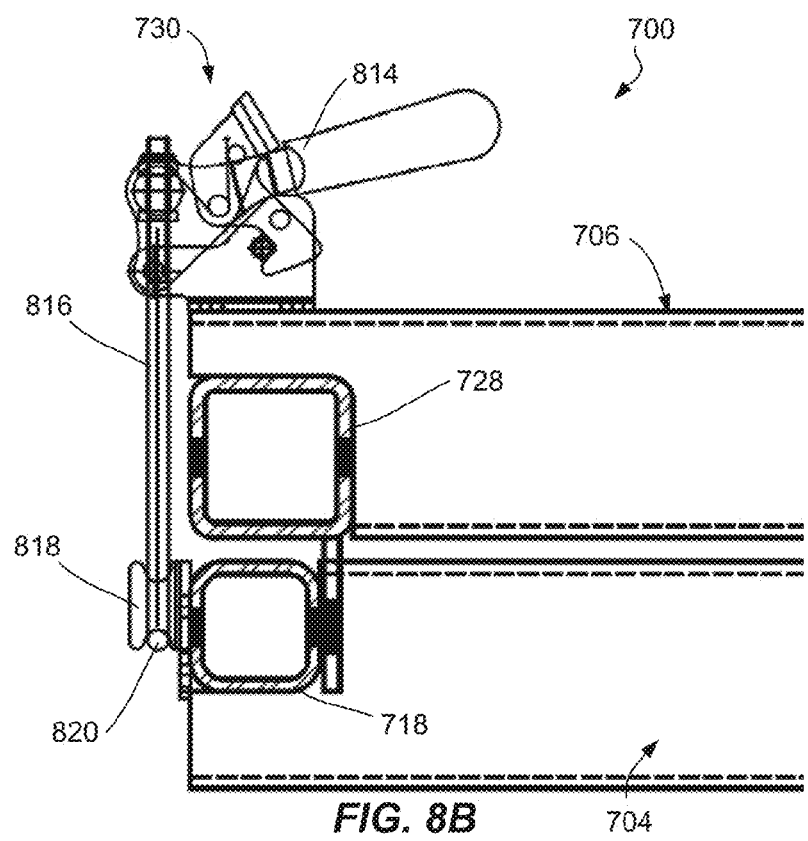
FIG. 8B is a side view of a latch of a hinged hitch adapter apparatus in a closed position.

A latch 730 may be used to link the first and second elongate members 704, 706 when the apparatus 700 is in the closed position. In some arrangements the latch 730 may comprise a locking mechanism 814, a latch retainer member 816, and a latch retaining post 818. By operating the locking mechanism 814, the latch retainer member 816 may move vertically to loosen or tighten a hook or loop 820 (or other lockable feature) against the retaining post 818. See FIGS. 8A-8B. Using this kind of locking mechanism 814 may improve the convenience of keeping the first and second elongate members 704, 706 secured to each other in the closed position without having to move or retain them using a pin or other loose device. Additionally, because the retainer member 816 is positioned external to the interior of the hitch adapter 710 and the receiver mount 702, it may not interfere with portions of a hitch or other device attached within the hitch adapter 710 or receiver mount 702.

Figure 9A:
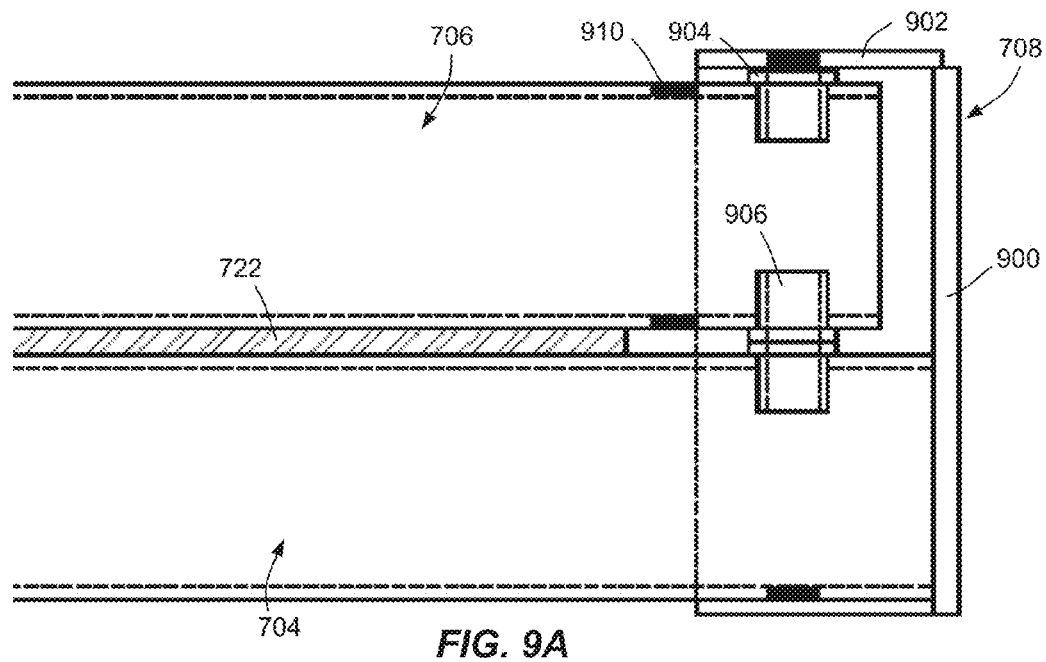
FIG. 9A is a side view of a joint of a hinged hitch adapter apparatus in a closed position.

The joint 708 of the hinged hitch adapter apparatus 700 may be a vertically oriented hinge linking the first and second elongate members 704, 706 vertically adjacent to each other. As shown in FIGS. 9A-9E, the first elongate member 704 may be affixed to a joint plate 900. In FIG. 9A, the hinged hitch adapter apparatus 700 is in a closed position and the end of the apparatus 700 having the joint 708 is shown in detail. The joint plate 900 may extend upward from the first elongate member 704 to connect to a top plate 902 positioned above the second elongate member 706. Pins 904, 906 may keep the elongate members 704, 706 properly positioned relative to each other and may support the elongate members 704, 706 as they pivot relative to each other and relative to the joint plate 900 and top plate 902. In this manner, the pins 904, 906 may be bearings for the elongate members 704, 706.

Figure 9B:
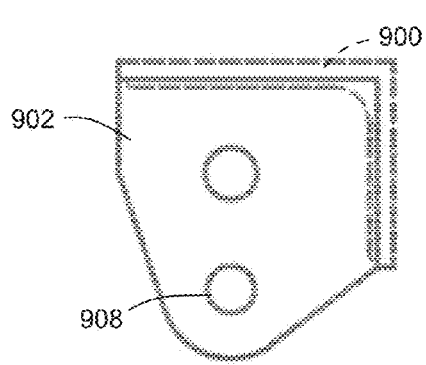
FIG. 9B is a top view of a plate of a hinged hitch adapter apparatus.
Figure 9E:
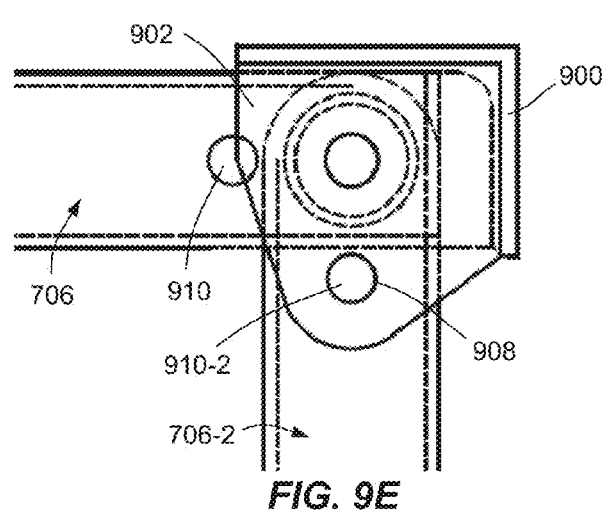
FIG. 9E is a top view of the joint of a hinged hitch adapter shown in FIG. 9A.

FIG. 9B shows a top view of the top plate 902 of the joint 708. The top plate 902 may include a locking aperture 908. The locking aperture 908 may be configured to receive a pin when the hinged hitch adapter apparatus 700 is in the open position. The pin may extend into the second elongate member 706 through a second locking aperture 910 when the second locking aperture is in the open position, as designated by reference numeral 910-2 in FIG. 9E.

Figure 9C:
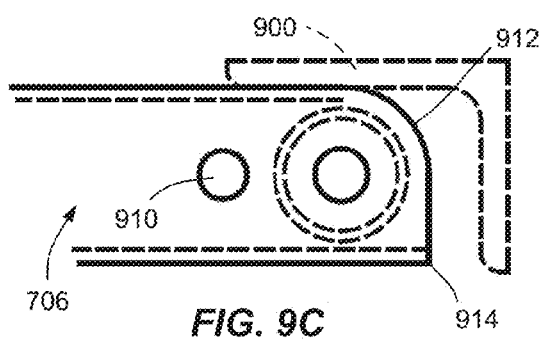
FIG. 9C is a top view of the end of an elongate member of a hinged hitch adapter apparatus.

As shown in FIG. 9C, the second elongate member 706 may rotate due to having a curved end surface 912. In FIG. 9C, the first elongate member 704 and top plate 902 are omitted. The curved end surface 912 of the second elongate member 706 may allow the second elongate member 706 to rotate without interfering with the joint plate 900. Once the second elongate member is in the open position (as shown by reference numeral 706-2 in FIG. 9E), however, its end corner 914 may contact the joint plate 900 and thereby prevent further rotation of the second elongate member 706-2.

Figure 9D:
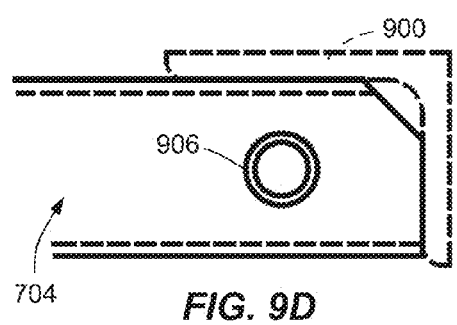
FIG. 9D is a top view of the end of another elongate member of a hinged hitch adapter apparatus.

FIG. 9D shows a top view of the first elongate member 704 where the joint plate 900 is attached. In this view, the second elongate member 706 and top plate 902 are omitted. This view illustrates that the joint plate 900 may be attached to a plurality of side surfaces of the first elongate member 704. The joint plate 900 may be attached to the first elongate member 704 securely by welding, a strong adhesive (e.g., epoxy), fasteners, or another permanent connection process. The L-shape of the top profile of the joint plate 900 may be beneficial for facilitating the attachment of the top plate 902, since the top plate 902 may be welded or adhered to each adjoining section of the L-shape of the joint plate 900. See also FIG. 9B.

Figure 10A:
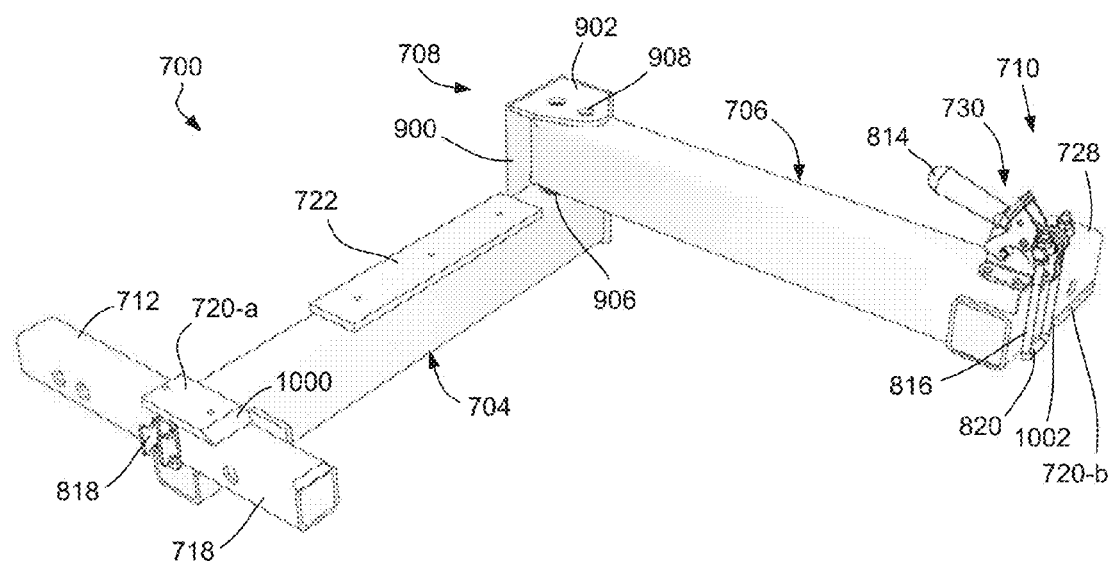
FIG. 10A is a perspective view of a hinged hitch adapter apparatus in an open position.
Figure 10B:
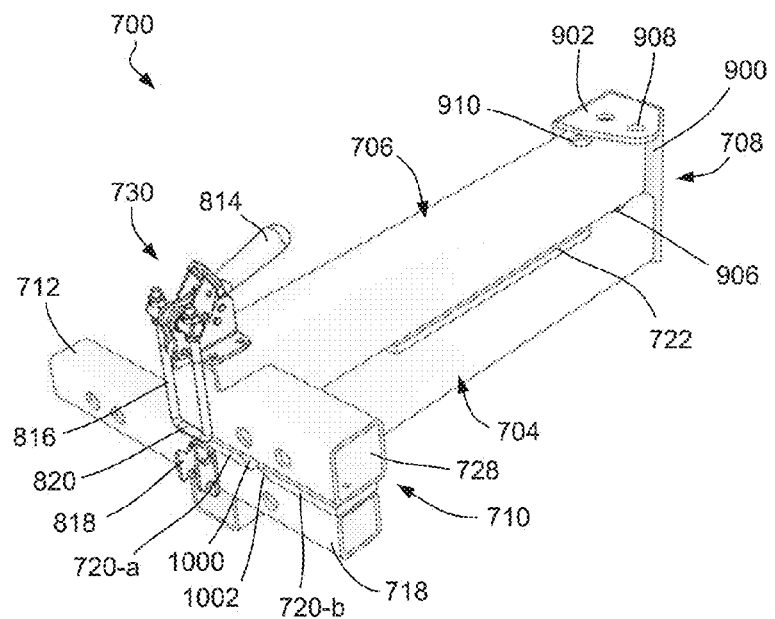
FIG. 10B is a perspective view of a hinged hitch adapter apparatus in a closed position.

FIG. 10A is a perspective view of the hinged hitch adapter apparatus 700 in an open position, and FIG. 10B is a perspective view of the hinged hitch adapter apparatus 700 in a closed position. These views show how the first and second elongate members 704, 706 pivot relative to each other in planes that are vertically separated from each other. These views also show that that first and second elongate members 704, 706 pivot relative to each other around a common vertically-oriented axis running through the joint 708.

FIGS. 10A-10B are also illustrative of the shape and positioning of the pad members 720, 722. As shown in these figures, at least pad member 720 may comprise a plurality of portions 720-a, 720-b that may come together and/or fit adjacent to each other when the hinged hitch adapter apparatus 700 is in a closed position. Sloped surfaces 1000, 1002 on the plurality of pad member portions 720-a, 720-b may assist the user in sliding the second elongate member 706 over the first elongate member 704 while closing the apparatus 700. These views also provide additional details of the latch retaining post 818 and other components of the latch 730.

In another aspect of the present disclosure, methods of manufacturing and assembling a hinged hitch adapter apparatus (e.g., adapter apparatus 100) may be implemented. The methods may include, for example, a method comprising steps such as providing a first and a second elongate member that are pivotally connected to each other (e.g., elongate members 104, 106), attaching a receiver mount (e.g., receiver mount 102) to the first elongate member and a hitch adapter (e.g., hitch adapter 110) to the second elongate member, mounting the receiver mount to a vehicle, and mounting an attachment rack to the hitch adapter.

These methods may also comprise fixing the second elongate member to the first elongate member at a first pivoted position and/or a second pivoted position. In some embodiments, the second elongate member may also be fixed at a third pivoted position. Fixing the pivoted position of the elongate members may comprise attaching a locking bolt or pin to the elongate members, to the hitch adapter, or the receiver mount.

In other embodiments, the method may comprise limiting the range of pivotal movement between the first and second elongate members. The range limiting feature may be provided by a stop surface, contact between the elongate members, or contact with an inserted pin or bolt. In other embodiments, the method may comprise selectably or adjustably mounting the receiver mount to the vehicle or to the first elongate member to provide at least right-facing or left-facing rotation of the second elongate member.

In another embodiment, the method may comprise adjusting a distance between the vehicle and an end of the hitch adapter by adjustably or selectively mounting the hitch adapter to the rest of the hinged hitch adapter apparatus. This mounting may be provided by a bolting system that secures the hitch adapter at a plurality of locations relative to the vehicle or relative to the second elongate member.

Another aspect of these methods may include limiting rotation of the second elongate member or an attachment rack attached to the hinged hitch adapter apparatus to stay within boundaries defined by the side of a vehicle to which the apparatus is mounted. These boundaries may be defined by the left and/or sides of the vehicle or by the rear of the vehicle.

In another embodiment, the methods may include spacing an attachment rack from a vehicle while providing rotational movement to the attachment rack away from the rear of the vehicle. This rotational movement may be provided by two pivotally attached links that are mounted to the vehicle and to the attachment rack.

These methods may provide improved access to the rear of a vehicle while still retaining the attachment rack and any associated cargo. They may simplify the storage and transport of loads on an attachment rack and improve the capacity and usability of a vehicle having a hitch mount with an apparatus that is inexpensive and easy to repair and maintain.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A hinged hitch adapter apparatus for providing pivotal movement to an attached mount, the hitch adapter apparatus comprising:
a receiver mount configured to be attachable to a hitch receiver;
a first elongate member having a first end and a second end, the first end attached to the receiver mount, the first elongate member extending laterally from the receiver mount;
a second elongate member having a first end and a second end, the first end pivotally attached to the second end of the first elongate member;
a hitch adapter attached to the second end of the second elongate member, the hitch adapter configured to be removably attachable to the first end of the first elongate member when the second end of the second elongate member is positioned proximate the first end of the first elongate member;
wherein the pivotal position of the first and second elongate members is reversibly securable by a locking pin.

2. The hinged hitch adapter apparatus of claim 1, wherein the pivotal position is reversibly securable at a predetermined relative angle between the first and second elongate members.

3. The hinged hitch adapter apparatus of claim 2, wherein the pivotal position is reversibly securable at a plurality of predetermined relative angles between the first and second elongate members.

4. The hinged hitch adapter apparatus of claim 1, wherein the locking pin reversibly secures the second end of the second elongate member adjacent to the first end of the first elongate member.

5. The hinged hitch adapter apparatus of claim 1, wherein the locking pin reversibly secures the pivotal position of the first and second elongate members adjacent to the pivotal attachment.

6. The hinged hitch adapter apparatus of claim 1, wherein the receiver mount is configured to be insertable into a vehicle trailer hitch receiver.

7. The hinged hitch adapter apparatus of claim 1, wherein the hitch adapter is configured to receive a vehicle trailer hitch.

8. The hinged hitch adapter apparatus of claim 1, wherein the hitch adapter is removably attachable at the second end of the second elongate member at a plurality of attachment positions relative to the second elongate member.

9. The hinged hitch adapter apparatus of claim 8, wherein the hitch adapter further comprising an attachment end, wherein when the hitch adapter is in a first position of the plurality of attachment positions, the attachment end is set at a greater distance from the second elongate member than when the hitch adapter is in a second position of the plurality of attachment positions.

10. The hinged hitch adapter apparatus of claim 1, wherein a range of relative pivotal movement of the first and second elongate members is limited.

11. The hinged hitch adapter apparatus of claim 10, wherein the range of relative pivotal movement is limited by interference of the second end of the first elongate member and the first end of the second elongate member.

12. The hinged hitch adapter apparatus of claim 10, wherein the range of relative pivotal movement is limited by contact of the second elongate member with the first elongate member.

13. The hinged hitch adapter apparatus of claim 10, wherein the range of relative pivotal movement is limited by contact of at least one of the first and second elongate members with a locking pin.

14. The hinged hitch adapter apparatus of claim 1, wherein the hitch adapter has an attachment end at least six inches from the hitch receiver upon securing the receiver mount in the hitch receiver.

15. A method of operating a hitch adapter apparatus, the method comprising:
providing a hitch adapter apparatus having a receiver mount, first and second elongate members each having first and second ends, and a hitch adapter, the first end of the first elongate member being attached to the receiver mount, the second end of the first elongate member being pivotally attached to the first end of the second elongate member, and the hitch adapter being attached to the second end of the second elongate member;
mounting the receiver mount to a hitch receiver of a vehicle;
releasably connecting the hitch adapter to the first end of the first elongate member when the second end of the second elongate member is positioned adjacent to the first end of the first elongate member;
wherein first elongate member is positioned vertically below the second elongate member.

16. The method of claim 15, further comprising providing an angle position stop, the method further comprising disconnecting the hitch adapter from the first end of the first elongate member and rotating the first and second elongate members relative to each other to an angle defined by the position stop.

17. The method of claim 15, further comprising providing at least one pad member positioned between the first and second elongate members.

18. A hinged hitch adapter apparatus for providing pivotal movement to an attached mount, the hitch adapter apparatus comprising:
a receiver mount configured to be attachable to a hitch receiver;
a first elongate member having a first end and a second end, the first end attached to the receiver mount, the first elongate member extending laterally from the receiver mount;
a second elongate member having a first end and a second end, the first end pivotally attached to the second end of the first elongate member;
a hitch adapter attached to the second end of the second elongate member, the hitch adapter configured to be removably attachable to the first end of the first elongate member when the second end of the second elongate member is positioned proximate the first end of the first elongate member;
wherein a range of relative pivotal movement of the first and second elongate members is limited by contact of at least one of the first and second elongate members with a locking pin.

19. A method of operating a hitch adapter apparatus, the method comprising:
providing a hitch adapter apparatus having a receiver mount, first and second elongate members each having first and second ends, and a hitch adapter, the first end of the first elongate member being attached to the receiver mount, the second end of the first elongate member being pivotally attached to the first end of the second elongate member, and the hitch adapter being attached to the second end of the second elongate member;

mounting the receiver mount to a hitch receiver of a vehicle;

releasably connecting the hitch adapter to the first end of the first elongate member when the second end of the second elongate member is positioned adjacent to the first end of the first elongate member;

providing at least one pad member positioned between the first and second elongate members.

* * * * *